United States Patent

[11] 3,556,478

[72] Inventor John P. Rausch
 Wheaton, Ill.
[21] Appl. No. 807,231
[22] Filed Mar. 14, 1969
[45] Patented Jan. 19, 1971
[73] Assignee FMC Corporation
 San Jose, Calif.
 a corporation of Delaware

[54] LIFT ROLLER STAND
 14 Claims, 7 Drawing Figs.
[52] U.S. Cl. ........................................... 254/1,
 214/1, 193/42
[51] Int. Cl. .................................................. B66f 1/00
[50] Field of Search ............................................ 254/1, 120,
 121; 214/1, 84; 193/42

[56] References Cited
UNITED STATES PATENTS
3,077,276  2/1963  Thwreatt ..................... 193/42

Primary Examiner—Andrew R. Juhasz
Assistant Examiner—David R. Melton
Attorneys—F. W. Anderson and C. E. Tripp ABSTRACT: This invention relates to portable hand operated combination lift and roller stands particularly useful in handling long lengths of welded railroad rail into and out of storage. Rollers are mounted on a portion of a shaft eccentric to a drive extension which may be rotated by a hand wrench and which is equipped with a reversible backstop mechanism to safely elevate the heavy rails. The roller shaft is supported in levers pivotally mounted in the base which have freely hanging pawls concentric with the drive extension cooperating with pawl steps in the base to obtain additional height variations.

PATENTED JAN 19 1971

INVENTOR
JOHN P. RAUSCH

BY F.W. Anderson
C.C. Tripp
ATTY'S

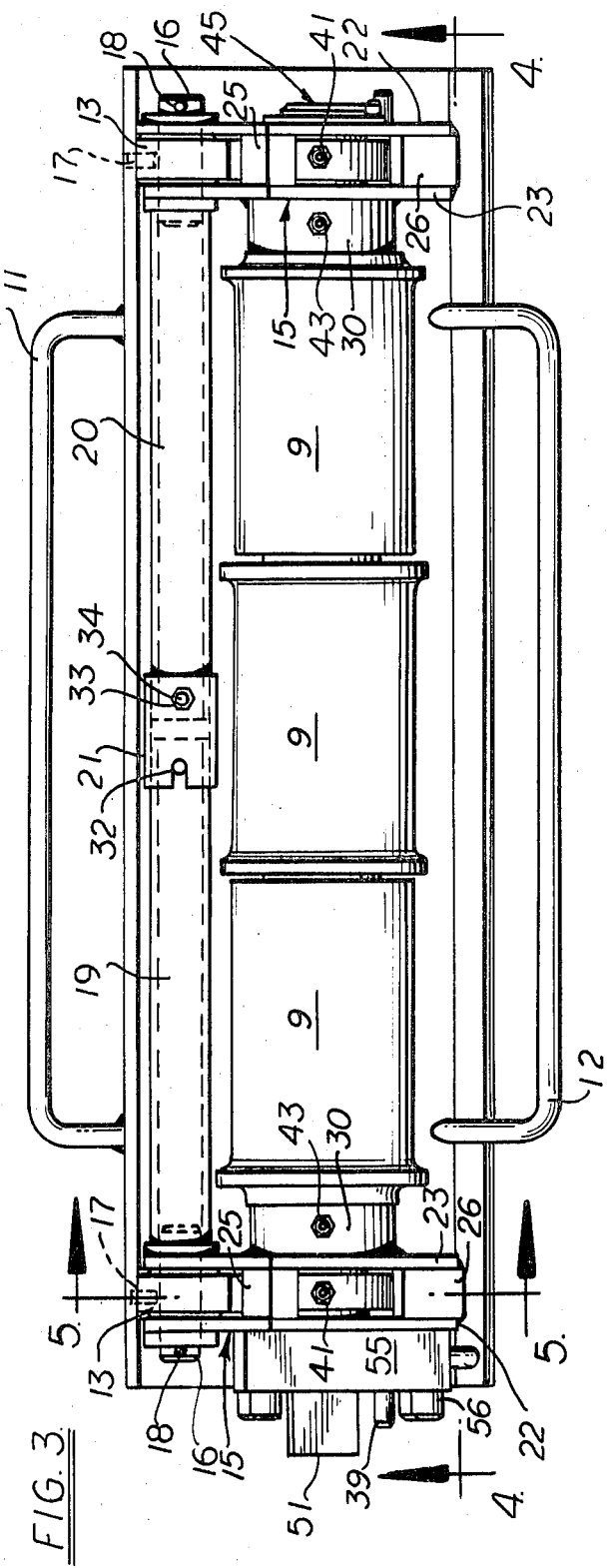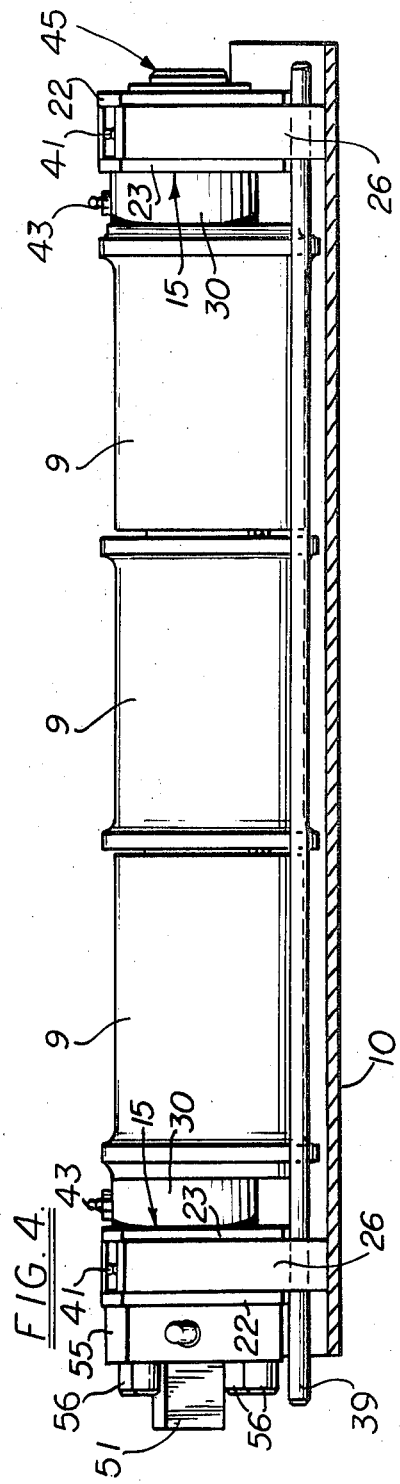

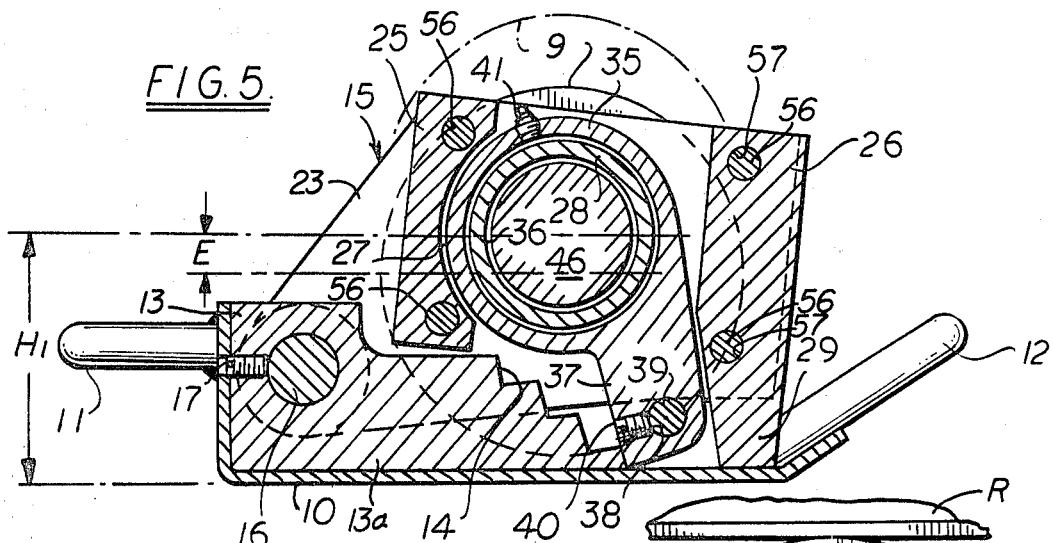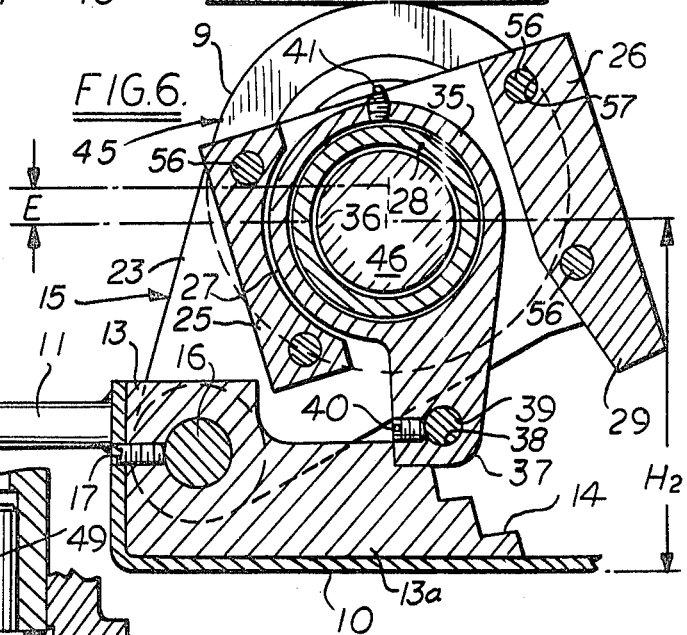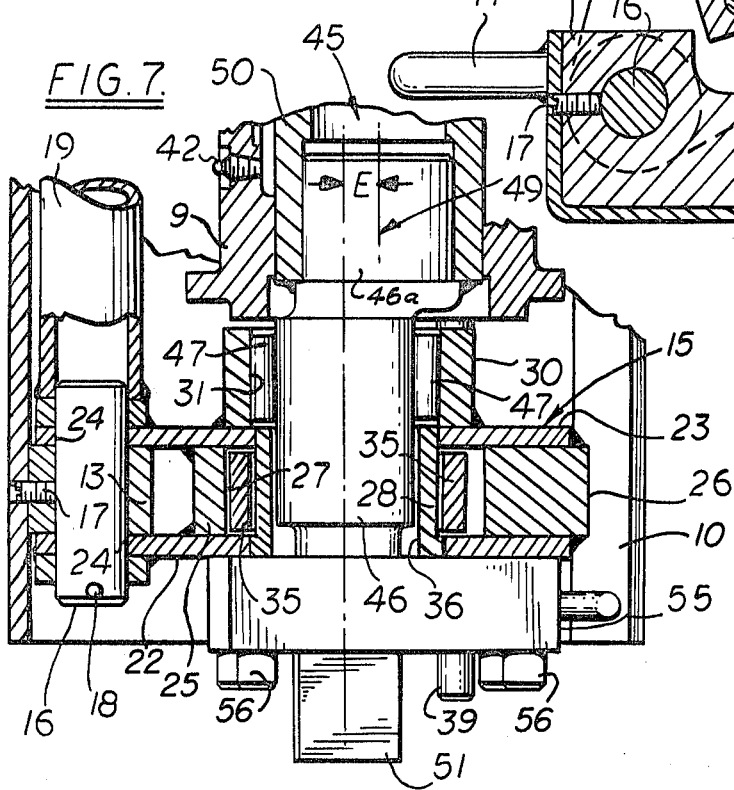

LIFT ROLLER STAND

BACKGROUND OF THE INVENTION

1. Field of the Invention

This lift roller stand finds use particularly in the handling of one quarter mile lengths of welded railroad rail which are heavy and hard to handle because of their length. The rails must be lifted, lowered and rolled in the various steps involved in moving them from the welding equipment into yard storage or out of storage on to the track laying train. These small portable units are usually spaced about 35 feet apart and, when equipped with tree rollers per unit, can normally handle the daily output of the rail welding and finishing equipment before shifting is required. Large amounts of labor or the large investment required for power operated conveyors or other equipment in a more automated welding plant are thus avoided.

2. Description of the Prior Art

The use of various forms of hand operated rail lifters and jacks incorporating a toothed sector cooperating with a pinion together with a ratchet and pawl mechanism to adjust the height of a single rail is old. Units of this type do not have a low enough silhouette for them to be pushed completely under a rail to an adjoining one nor do they have rollers on which the rails may be moved and, accordingly, they are normally used beside only one rail.

The use of rollers which are mounted in slots in the floor of a platform or truck body and which may be raised above the floor level to move material across the floor more easily is also old. However these are fixed units where portability and ease of changing their location is not required.

The innovation of welding railroad rail into one-quarter mile lengths to eliminate the many intermediate joints in using standard 39 foot lengths has required new equipment to facilitate handling these long rails. One method has utilized a special train in which the welder and grinding equipment is mounted on one car. A power operated pusher then pushes the completed rail through multiroller, multilayer A frame stands, usually mounted one to a car, through as many stands and/or cars as required for the full length of the rail. The car roller stands do not need any height adjustment but just the rollers to facilitate the movement of the rail and act as storage racks until the train is moved to the track laying position where the rails are just pulled out of their storage position.

In yard storage a more compact storage pile is necessary and the rails are stored close together laterally with possibly 25 rails to one layer and with only conventional railroad ties separating each layer. There may be as many as five layers to a single storage pile. This means of storage proves desirable and economical where the laying of the new track is done quicker than the rail is welded and the rail must be accumulated. It is in this type of application where the present invention is normally used.

SUMMARY OF THE INVENTION

This invention provides in a simple, portable unit a means to safely raise a heavy, elongated object several inches by hand and to move the object to a desired position when the desired elevation is obtained, with little resistance, by means of its self-contained rollers.

One object of this invention is to provide a hand operated elevating unit capable of small increments of adjustment and which may be quickly lowered when desired.

Another object of this invention is to provide a simple hoist unit equipped with a roller on which the object rests.

A further object is to provide a low silhouette hoist unit capable of being placed under railroad rails and lower in overall height than standard railroad ties.

Another object is to provide a roller equipped hand operated hoist unit that is light enough to be portable for easy movement to a new location.

Still another object is to provide a self-contained portable multiple roller stand which may be operated from one end of the unit for handling objects like welded railroad rail which will readily assist placing the rail in closely spaced, multilayer storage piles.

BRIEF DESCRIPTION OF THE DRAWINGS

In the accompanying drawings which form a part of this specification and in which like reference characters designate like parts in all of the views:

FIG. 3 is a plan view of the lift roller stand of FIG. 1.

FIG. 4 is a sectional view taken along line 4–4 of FIG. 3.

FIG. 5 is a section taken along line 5–5 of FIG. 3 with the roller in its lowermost position.

FIG. 6 IS a section similar to FIG. 5 but showing the roller in its highest position.

FIG. 7 is a section taken along line 7–7 of FIG. 2 with the roller rotated 90° to illustrate the eccentricity of the shaft.

DETAILED DESCRIPTION OF THE INVENTION

Figure 1:
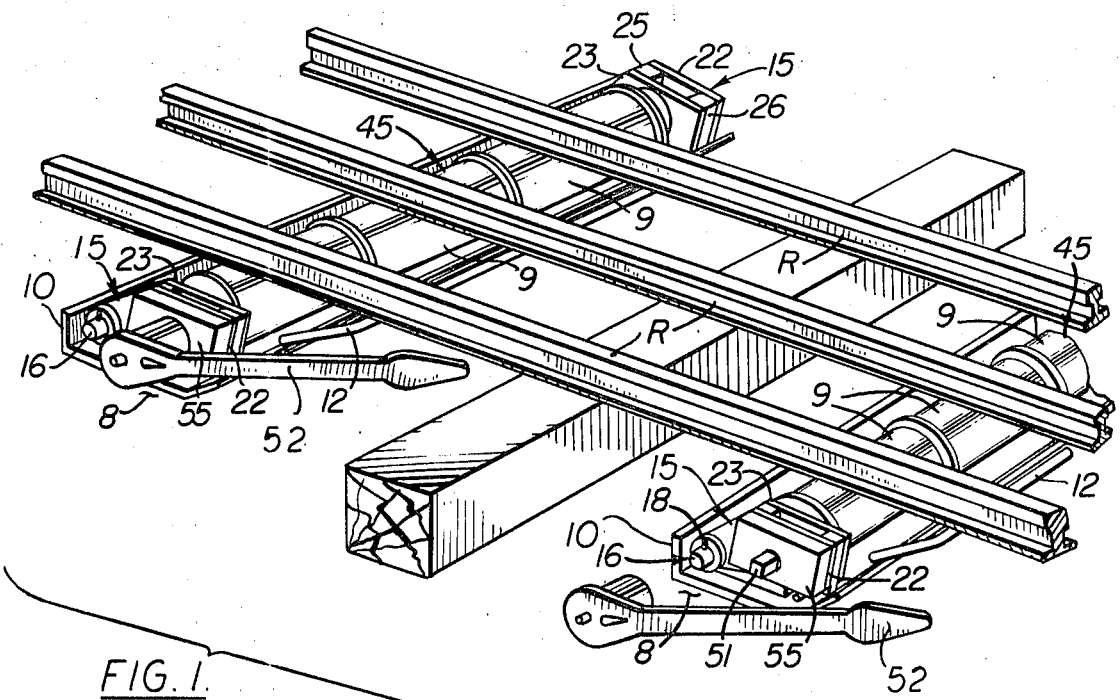
FIG. 1 is a perspective view of two of the lift roller standards of the present invention being used under three rails.
Figure 2:
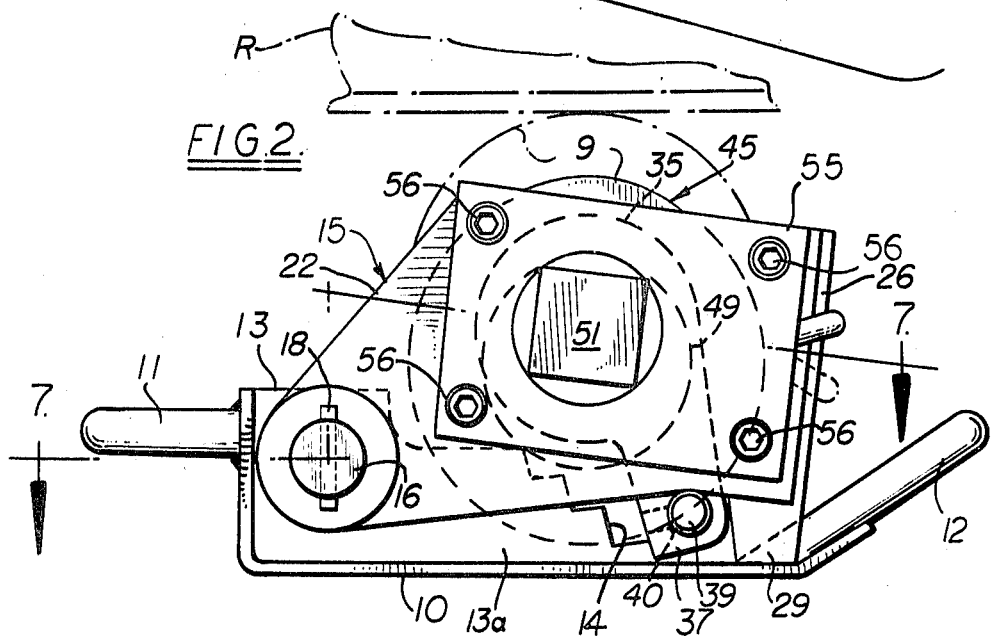
FIG. 2 is an end elevational view of the lift roller stand of FIG. 1.

In the embodiment of this invention as shown in FIGS. 2—4 the lift roller stand 8 is composed of a base 10 having two long carrying handles 11 and 12 parallel to the longitudinal axis of the base, two aligned pivot bearings 13 secured to the base to form a part thereof and located transversely to one side of the longitudinal centerline of the base on the opposite ends of the base, and a pair of pawl steps 14, each of which is formed on an extension 13a of one of the bearings 13. A lever assembly 15 is pivotally mounted in each pivot bearing 13 on a stub shaft 16 at each end of the base, each lever being movable from the lowered position of FIG. 5 to the raised position of FIG. 6 to raise and lower three center rollers 9 (FIG. 1). Each stub shaft is retained in a pivot bearing 13 by a setscrew 17, and by a dowel pin 18 in the end of the shaft outside of a lever plate 22 which forms a part of the lever assembly 15. The two lever assemblies 15 are rigidly connected by two torque tubes 19 and 20 that are joined together by a torque equalizing coupling 21 so that both lever assemblies, each of which is welded to one of the torque tubes, rotate together when operated from only one end.

As shown in FIG. 3, the torque tube 19 is provided with a pin 32 welded to the tube adjacent its end opposite the lever assembly. Both ends of this pin project beyond the outside of the torque tube, and the axis of the pin is located approximately 10° from the vertical axis when the lever assembly connected to tube 19 is in its lowest position. Torque tube 20 is provided with a drilled hole adjacent its end that is opposite the other lever assembly, the hole being disposed approximately 15° from the vertical axis when the lever is in its lowest position. Coupling 21, which fits over the ends of tubes 19 and 20, is provided with a slot in one of its ends to receive the pin 32 and with a drilled hole that has a nut 33 welded centrally thereover on one outer surface adjacent the opposite end of the coupling. Both the slot and the hole in the coupling are in alignment on the coupling's longitudinal axis. In assembly, the coupling 21 is slipped over the end of tube 19 so the slot engages the pin 32. The torque tube 20 is then slipped into the coupling. The lever assembly connected to tube 20 is then rotated slightly to overcome the 5° misalignment of the hole in the coupling and the hole in the torque tube 20 so that threaded pin 34 may be inserted through the aligned holes to engage the nut 33 on the coupling. The slight twisting to align the holes effectively pretorques the tubes so that both lever assemblies will move in unison and have no lost motion. After the coupling is assembled to the torque tubes, the entire assembly may then be lowered so that sideplates 22 and 23 of each lever are on opposite sides of one of the pivot bearings 13, and the pivot shafts 16 are then inserted.

The two lever assemblies 15, as shown in FIGS. 3, 5 and 7, are essentially identical except that they are right and left hand and only one lever 15 has a backstop. They are made up of the two side plates 22 and 23 with aligned holes 24 therethrough on one end to receive the stub shafts 16, two spacer plates 25 and 26 secured between the plates 22 and 23 and providing an opening 27, and a cylindrical bushing 28 secured in aligned holes on the opposite end of the lever assembly, said bushing passing through both plates 22 and 23. Spacer plate 26 also has a foot portion 29 extending to the base on their extreme end to form a stop that determines the lowermost position for the pivotal lever assembly 15. On the inner side of the lever assembly, a hub 30 is welded to the plate 23, having its bore 31 concentric with bushing 28. A lubrication fitting 43 is provided, as shown in FIG. 3, in the hub for lubricating a bearing 47 that is disposed inside the hub 30.

As shown in FIGS. 5 and 6, a pawl 35 which is disposed in the opening 27 in the lever has a hub 35a with a large bore 36, which freely receives the outside of bushing 28. A foot 37 extends from hub 35a and cooperates with the pawl steps 14. In the lower end of each pawl, a hole 38 is drilled, and a rod 39 is inserted connecting both pawls so they work in unison. The rod 39 is retained in the pawl by a setscrew 40. The foot end of the pawl 37 rests on one of the pawl steps 14 and provides the necessary rigid support for the associated pivoted lever assembly 15. A lubrication fitting 41 is provided in the top surface of pawl 35.

A roller shaft assembly 45 includes a composite shaft 46 (FIG. 7) and the three rollers 9, as shown in FIG. 3. The shaft 46 includes two short shafts 46a one of which is journaled at each end of the shaft assembly in a bearing 47 which is supported in the bore 31 of hub 30. Each short shaft 46a is machined with a cylindrical eccentric section 49, and a sleeve 50 is welded to the two cylindrical eccentric sections 49, when the axes of the sections are in alignment, thus forming a unitary shaft assembly with the sleeve 50 and the two sections 49 defining a single eccentric section of shaft 46. The rollers 9 have a lubricating fitting 42 and rotate freely on a grease-lubricated hardened surface 48 of the sleeve 50. Each roller 9 is equipped with at least one flange on its outer surface to guide and retain the object handled. Shaft 46 also contains a square-ended extension 51 on one end on which a large ratchet wrench 52 (FIG. 1) or other means may be mounted for rotating the shaft assembly.

As shown in FIGS. 2, 3 and 7, a manually reversible backstop mechanism 55 is mounted on the outer side of sideplate 22 of the lever assembly 15 that has the drive shaft extension 51. Capscrews 56 are threaded into threaded holes 57 in the spacer plates 25 and 26 to retain this mechanism in place. This backstop unit is concentric with the bearings, pawls and drive extension and operates on the square ended portion 51 of the shaft 46. In the embodiment shown, the backstop is a ratchet type clutch with a reversing feature which permits small increments of shaft rotation and locks against reverse travel when set for operation in one position, such as clockwise rotation. One ratchet clutch has been found suitable for this type of installation; a unit marketed by the Lowell Corporation of Worcester, Mass. under the designation model 74. Such a clutch permits freewheeling in the forward clockwise direction, if the load imposed is sufficient as when the eccentric shaft goes over its top dead center position. When the reverse lever is operated, the reverse operation results and shaft may rotate in the counterclockwise position while locking in the clockwise direction.

In FIG. 1, the lift roller stands 8 are shown in position to unload the last layer of rails R from a storage pile. The lever assemblies 15 have actuated to move the roller shaft assembly 45 and the rollers 9 to their lowermost position under the rails, with the pawls 35 on their lowest steps, and the shaft 46 rotated so that the shaft eccentricity is below the centerline of the bearing bore in the lever assembly. This position is shown in FIG. 5. The roller shaft assembly 45 is then manually lifted by rotating the lever assemblies 15 counterclockwise, as shown in FIGS. 2 and 6 to move the rollers 9 as close to the bottom of the rails as the pawl engagement with the pawl steps allows. The backstop is then engaged for clockwise rotation, and the ratchet wrench 52 placed on the drive extension shaft. The wrench 52 normally has a handle length of 36 inches to 42 inches in order to obtain sufficient torque by hand to lift the three rails. The wrench is then operated clockwise, causing the eccentric shaft to rotate clockwise in small increments thereby raising the rollers 9 and the rails thereon. The rollers are raised until the rails clear all the supporting ties. The rails may then be rolled out of the storage pile. If this had occurred on an upper layer of the storage pile, the stands 8 would be moved, after the rails of the upper layer and ties supporting the upper layer have been removed and replaced under the next layer of rails. This process is continued until the last layer of rails is removed.

When rails are moved into storage and a storage pile started a slightly different routine is followed. The ties and the lift roller stands are placed along the ground level at approximately 35 foot spacings. The unloaded roller shaft assembly is manually lifted to a position so that the top of the rollers are higher than the ties being used. This is done by pivoting the lever assembled 15 and letting the pawls 35 drop into the desired higher step. The eccentric shaft is then rotated clockwise to near its top dead center position. This arrangement is illustrated in FIG. 6. After three rails are in position on top of the three rollers, the unit is ready to lower the three rails to the top of the ties. Normally the rails are lowered by rotating the eccentric shaft clockwise with the backstop set for clockwise operation. This raises the rails until the eccentric point goes over center. As further rotation of the shaft starts, the gravity weight will take over and overrun the backstop or free wheeling results. The rails quickly drop to the top of the ties. The stands are pulled out from under these rails and then placed on top of this layer of rails. Ties are placed alongside of the stands. The process can then be repeated for another layer of rails and so continued until the desired height of rails is reached.

It is also possible to raise the lever and roller shaft assembly by means of the wrench and take advantage of the backstop action. To raise the roller shaft, the lever assembly rotates in a counterclockwise direction about its pivot bearing. The backstop unit is set for counterclockwise rotation while the ratchet wrench is operated in the opposite or clockwise direction. The resulting motion, with the roller shaft locked, causes the lever assembly to rotate upwardly about its pivot axis lifting the pawls. The freely hanging pawls swing by gravity under the roller shaft and climb up the pawl steps one at a time as high as desired, resting on the highest desired step when the wrench rotation is stopped. In this position it again rigidly supports the roller shaft assembly.

If it is desired to lower the lever assembly without load on the rollers, the pawls are pushed off the pawl steps dropping the lever assembly with the roller shaft to the next lower steps. This action is assisted by the rod connecting the two pawls so that both pawls work simultaneously.

In one embodiment of this invention, the rollers are each 4½ inches in diameter by 7¼ inches long with a 5⅛ inches diameter single flange on the end rollers and a double flange on the center roller. As shown in FIGS. 5 and 6, the shaft has an eccentricity E of ½ nches, thus giving a total lift of 1 inch and the four pawl positions provide a change in height of 1 5/16 inches between $H_1$ and $H_2$. The top of the roller in its lowest position is 5⅛ inches above the bottom of the base, while the top of the roller in its highest position would be 7 7/16 inches above the base, thus giving a maximum height variation of 2 5/16 inches. The unit is approximately 31½ inches long with three rollers and 13 inches wide over the two handles.

In another embodiment of the invention the lever assembly is arranged with a hand operated, pivoted hydraulic jack or a small double acting cylinder connected to a closed circuit hydraulic system equipped with a hand pump. The roller assembly can then be raised and lowered under the assistance of hydraulic power alone and the backstop, the eccentricity on the shaft and the ratchet wrench may be eliminated.

In a further embodiment of the invention, a rotary hydraulic cylinder capable of reciprocating through approximately 210° of arc and equipped with a closed circuit hydraulic system having a hand pump may be used on the shaft extension in lieu of a ratchet type wrench and the backstop on the lever assembly may be eliminated.

Although the best mode contemplated for carrying out the present invention has been herein shown and described, it will be apparent that modifications and variation may be made without departing from what is regarded to be the subject matter of the invention.

I claim:

1. A lift stand comprising:
   a. a base;
   b. lever means pivoted on said base;
   c. article contacting roller means carried by said lever means at a point spaced from the pivot axis of said lever means;
   d. a rotary lift mechanism operatively connected between said roller means and said lever means for elevating said roller means to raise an article thereon; and
   e. abutment means associated with said lever means and engaging said base to transmit the load on said roller means to said base during actuation of said rotary lift mechanism.

2. A stand according to claim 1 wherein said rotary lift mechanism includes a rotary ratcheting drive mechanism.

3. A stand according to claim 1 wherein said abutment means comprises a pawl mounted for movement with said lever means.

4. A lift stand comprising:
   a. a base;
   b. lever means pivoted on said base;
   c. article contacting roller means carried by said lever means at a point spaced from the pivot axis of said lever means;
   d. abutment means operably connected between said base and said lever means to hold said lever means in a preliminary position wherein said roller is raised to a predetermined position above said base; and
   e. rotatable actuating means disposed inside said roller and anchored in said lever means for raising said roller above said predetermined position to elevate an article in contact therewith.

5. A lift stand according to claim 4 wherein said abutment means comprises a stepped bearing member, secured to and forming a part of said base, and a pivoted pawl movable with the end of said lever that carries said roller.

6. A lift stand according to claim 4 wherein said lever means includes a pair of spaced levers and said rotatable actuating means comprises a shaft journaled for rotation in said spaced levers and having an intermediate eccentric portion carrying said article contacting roller.

7. A lift roller stand comprising the combination of:
   a. an elongate base, a support on said base adjacent each longitudinal end thereof located transversely to one side of the longitudinal centerline of the base;
   b. a pair of lever assemblies, each assembly being mounted at one of its ends in a support and having a foot projecting downwardly from its opposite end resting on said base;
   c. a shaft rotatably supported in the lever assemblies at the lever end opposite the associated support, said shaft having a drive extension protruding outside one of the lever assemblies and having an eccentric section between the lever assemblies;
   d. a roller rotatably supported on the eccentric section of said shaft;
   e. backstop means mounted on the outer side of said one lever assembly cooperating with said drive extension; and
   f. means for rotating said shaft whereby the roller is raised or lowered by the eccentric section of the shaft as said shaft is rotated.

8. A lift roller stand as in claim 7 wherein said means for rotating the shaft comprises a ratchet type hand wrench whereby short increments of rotation may be readily made with the load held by the backstop and the wrench handle may be located at any convenient angle.

9. A lift roller stand as in claim 7 wherein the backstop means is a reversible ratchet type clutch, whereby the clutch will permit small increments of shaft rotation in one direction but prevent motion in the opposite direction until a control lever is manually repositioned reversing the action.

10. A low profile hand operated hoist unit with a load supporting roller, the combination which comprises:
    a. an elongate base, a pivot bearing adjacent each longitudinal end of said base located transversely to one side of the longitudinal centerline of said base, each bearing having pawl steps;
    b. a lever assembly pivotally mounted at one of its ends in each of the pivot bearings;
    c. a shaft rotatably mounted in the lever assemblies at the end opposite the pivot bearings and having a drive extension protruding outside of one lever assembly concentric with the axis of rotation of said shaft and having an eccentric section between the lever assemblies;
    d. a pawl pivotally supported on each of said lever assemblies concentric with said rotatable shaft and having a foot portion cooperating with the pawl steps in said base, whereby the shaft height above the base may be manually varied depending upon the pawl step engaged by the pawl as the lever assembly is pivoted;
    e. a roller rotatably mounted on the eccentric section of said shaft;
    f. backstop means mounted on the outer side of one lever assembly cooperating with the drive extension; and
    g. a ratchet wrench attached to said drive extension for rotating said shaft, whereby the roller is raised or lowered by the eccentric section of the shaft as it is rotated.

11. A hoist unit as in claim 10 wherein a rod connects said foot portion of the pawls, whereby the pawls move in unison in both upward and downward directions.

12. A hoist unit as in claim 11 wherein when said backstop is locked against clockwise movement of the shaft and said ratchet wrench is rotated in the clockwise direction, the lever assemblies pivot upwardly in a counterclockwise direction raising the shaft and permitting the pawls to seat on higher pawl steps, whereby the roller height may be varied under load with the assistance of the wrench above that obtainable by the eccentric action of the shaft rotation alone.

13. A portable load lifting unit equipped with a roller the combination comprising:
    a. an elongate base, a pivot bearing mounted adjacent each longitudinal end of said base and located transversely to one side of the longitudinal centerline of said base, pawl steps formed on each pivot bearing;
    b. A pair of lever assemblies, each assembly being pivotally mounted at one of its ends in one of said pivot bearings;
    c. torque equalizing means connecting the pair of lever assemblies, whereby each lever assembly moves in unison with the other as the lever assemblies are pivoted;
    d. a shaft rotatably mounted in each of the lever assemblies at the lever and opposite the associated pivot bearing and having a drive extension protruding outside of one lever assembly concentric with the axis of said shaft and having an eccentric section between said lever assemblies;
    e. a pawl pivotally mounted on each of said lever assemblies concentrically with the axis of said shaft and cooperating with the pawl steps in said base;
    f. a roller rotatably mounted on the eccentric section of the shaft; and
    g. means for rotating the shaft.

14. A load lifting unit as in claim 13 wherein the torque equalizing means for connecting the lever assemblies further comprises:
   a. a first torque tube attached to the lever assembly adjacent the drive extension;
   b. a pin secured in said first torque tube adjacent the tube end opposite the lever assembly and projecting beyond the outer surface of the torque tube;
   c. a second torque tube attached to the other lever assembly and having a radial hole therethrough adjacent the opposite end of said second torque tube, the radial plane of said hole being displaced about about 5° from the radial plane of the pin in said first torque tube when the lever assemblies are in alignment;
   d. a cylindrical coupling mounted over the adjoining ends of said torque tubes having a slot in one end matingly engaging the projecting ends of the pin in the first torque tube and having a hole therethrough having a nut concentrically attached above the hole in the opposite end of said coupling in alignment longitudinally of the coupling with the slot; and
   e. a threaded pin inserted through the hole in the coupling and the hole in the second torque tube and engaging the threaded nut when said second torque tube is rotated upwardly about 5°, whereby the torque tubes are placed under an initial torque.